(12) United States Patent  (10) Patent No.: US 7,367,908 B2
Lemberger et al.  (45) Date of Patent: May 6, 2008

(54) BELT TENSIONING DEVICE

(75) Inventors: Heinz Lemberger, Unterföhring (DE); Rudolf Berger, Simmerath (DE); Manfred Jung, Aachen (DE); Vladimir Kobelev, Attendorn (DE)

(73) Assignee: Muhr Und Bender KG, Attendorn (DE)

( * ) Notice: Subject to any disclaimer, the term of this patent is extended or adjusted under 35 U.S.C. 154(b) by 632 days.

(21) Appl. No.: 10/707,769

(22) Filed: Jan. 10, 2004

(65) Prior Publication Data

US 2004/0171448 A1   Sep. 2, 2004

(30) Foreign Application Priority Data

Jan. 10, 2003  (DE) ................. 103 00 875
May 14, 2003  (DE) ................. 103 21 801

(51) Int. Cl.
    *F16H 7/12*  (2006.01)
(52) U.S. Cl. ................................... 474/138
(58) Field of Classification Search ........ 474/133–135, 474/101, 109, 117
    See application file for complete search history.

(56) References Cited

U.S. PATENT DOCUMENTS

| | | | | |
|---|---|---|---|---|
| 660,570 A | * | 10/1900 | Green | 474/135 |
| 3,136,170 A | * | 6/1964 | Murray | 474/135 |
| 3,817,113 A | * | 6/1974 | Pfarrwaller | 474/134 |
| 5,334,109 A | * | 8/1994 | Izutsu et al. | 474/135 |
| 5,599,245 A | | 2/1997 | Giese | |
| 6,264,578 B1 | * | 7/2001 | Ayukawa | 474/135 |
| 6,575,860 B2 | * | 6/2003 | Dutil | 474/135 |
| 6,960,145 B2 | * | 11/2005 | Fraley et al. | 474/134 |

FOREIGN PATENT DOCUMENTS

| | | |
|---|---|---|
| DE | 37 19 794 A1 | 12/1988 |
| DE | 39 12 944 A1 | 9/1990 |
| EP | 1 420 192 A2 | 5/2004 |
| EP | 1 420 193 A2 | 5/2004 |
| JP | 4 101848 | 9/1992 |
| JP | 6 72090 | 3/1994 |
| JP | 6159459 | 6/1994 |
| JP | 06159459 | 7/1994 |
| JP | 08021497 | 1/1996 |
| JP | 200239299 | 2/2002 |
| WO | WO (02/29279 A2 * | 4/2002 |
| WO | WO 2004/042253 A1 | 5/2004 |

\* cited by examiner

*Primary Examiner*—Marcus Charles

(57) ABSTRACT

A belt tensioning device for a continuous belt drive. The device includes a torsion spring assembly (20) with a longitudinal axis ($A_2$) and with at least one torsion bar or torsion tube (32). The torsion spring assembly (20) can be clamped axially and in a rotationally fast way into a rack. A tensioning arm (19), at one end, is arranged at the torsion spring assembly (20) so as to be aligned approximately radially relative to the longitudinal axis ($A_2$). A tensioning roller (15) is rotatably fixed at the other end of the tensioning arm (19). The axis of rotation ($A_1$) of the tensioning roller (15) extends substantially parallel relative to the longitudinal axis ($A_2$) of the torsion spring assembly (20), and the tensioning arm (19) can be resiliently supported relative to the rack so as to oscillate around the longitudinal axis ($A_2$).

8 Claims, 10 Drawing Sheets

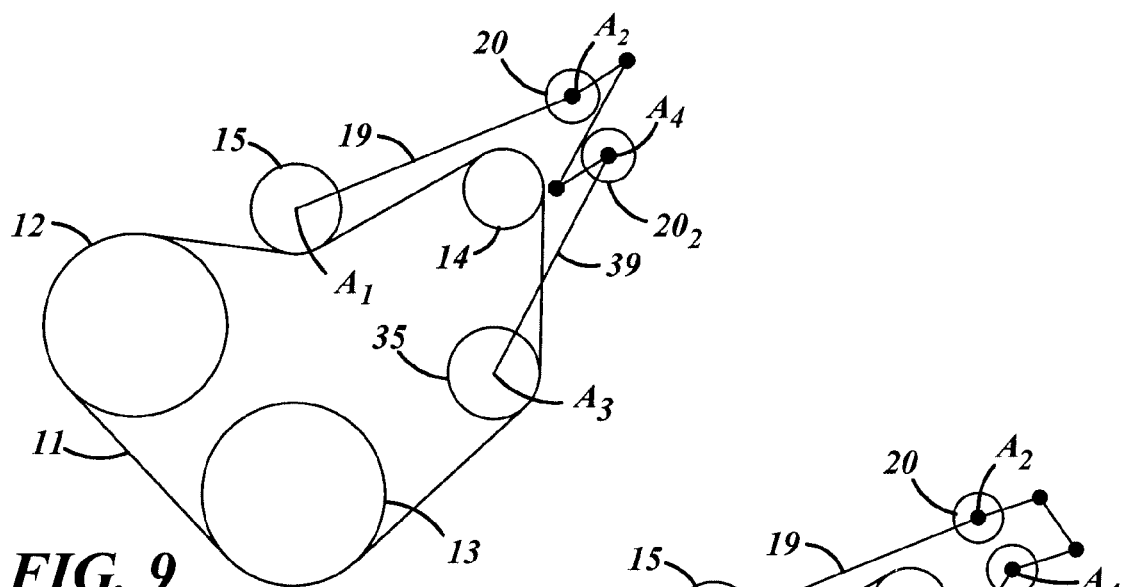
FIG. 9
FIG. 10
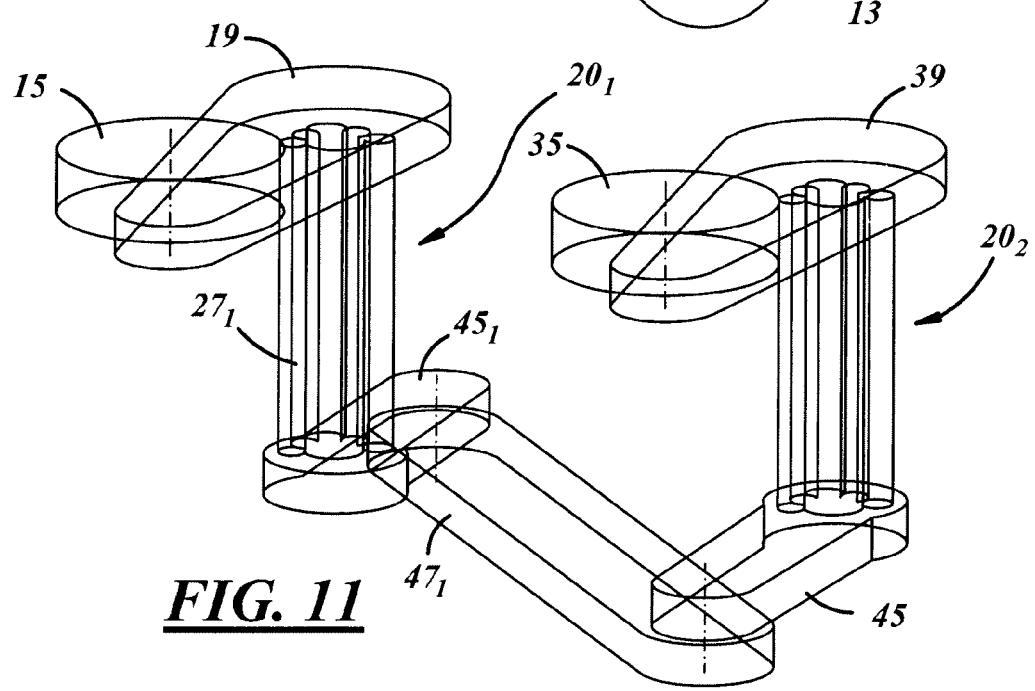
FIG. 11

BELT TENSIONING DEVICE

BACKGROUND OF INVENTION

The invention relates to a belt tensioning device for a belt drive having at least two belt pulleys and a continuous belt, and a torsion spring assembly.

A typical belt drive application is the drive of auxiliaries of an internal combustion engine, wherein a first belt pulley is positioned on the crankshaft and drives the belt drive, with further belt pulleys being positioned on auxiliaries such as a water pump, generator, air conditioning compressor etc. and being driven by the belt drive. In the direction of rotation, behind the driving belt pulley, there exists a slack strand whose slack has to be balanced by a tensioning roller to ensure that the belt does not slip off the belt pulleys. The belt length changes in the course of the operating period and under the influence of temperature, so that the tensioning roller has to be resiliently displaceably held in guiding means or, preferably, it has to oscillate at a resiliently suspended tensioning or rocker arm.

In the case of belt drives for driving auxiliaries of an internal combustion engine, which include a starter generator, between the engine operation on the one hand and the starter operation on the other hand, there occurs a change between the pulling strand and the slack strand on both sides of the belt pulley of the starter generator. In such a case, it is necessary to provide spring-loaded tensioning rollers for both the above-mentioned strands. One tensioning roller is effective at the slack strand under spring force, whereas the other one is optionally pushed back by the tensioned pulling strand against the spring force of same.

As a rule, the pre-tensioning forces acting on the tensioning rollers are applied by sprint assemblies which are positioned in the region of the bearing of a tensioning arm and contain stirrup springs, i.e. helical or hairpin springs with two radially projecting stirrups in the case of which there can occur a change in angle of the two projecting stirrups relative to one another against resilient spring forces. The stirrup spring either contracts or widens. Spring units of this type require a relatively large installation diameter which is not available in all applications.

From DE 39 12 944 A1, there is know a belt tensioning device wherein the spring element is provided in the form of a rotary bar spring which is composed of a plurality of rotary bars and whose longitudinal axis extends parallel to the axis of rotation of the tensioning roller. The tensioning roller is supported in a tensioning lever which is arranged at the free end of the rotary bar spring. The fixed end of the rotary bar spring is firmly clamped into holding means provided with bolting means for being fixed to a fixed housing. In order to prevent the rotary bar spring from bending under load, it is arranged in a guiding tube, with the rotary bar spring and the guiding tube, at the end carrying the tensioning lever, both being connected in a rotationally fixed way to the tensioning lever. The guiding tube, in turn, is rotatably supported in the engine block.

Thus, there exists a need for a compact belt tensioning device suitable for standard drives with an unchanging driving pulley and belt drives with changing driving pulleys.

SUMMARY OF INVENTION

The present invention provides a compact belt tensioning device which is suitable both for standard belt drives with an unchanged driving pulley, and for belt drives with changing driving pulleys.

A first solution is provided by a belt tensioning device for a belt drive having at least two belt pulleys and a continuous belt. The device includes a torsion spring assembly with a longitudinal axis $A_2$ and with at least one torsion bar or torsion tube. The torsion spring assembly can be clamped axially and in a rotationally fixed way into a rack. The tensioning device further includes a tensioning arm which, by way of its one end, is arranged at the torsion spring assembly so as to be aligned approximately radially relative to the longitudinal axis $A_2$, as well as a tensioning roller which is rotatably fixed at the other end of the tensioning arm. The axis of rotation $A_1$ of the tensioning roller extends substantially parallel relative to the longitudinal axis $A_2$ of the torsion spring assembly. The tensioning arm can be resiliently supported relative to the rack so as to oscillate around the longitudinal axis $A_2$. This first solution is suitable for applications which, in operation, have an unchanged driving pulley.

In an axial view of the belt drive, it is possible to achieve installation dimensions for the tensioning device which are determined practically entirely by the required size of the tensioning arm. In an axial view, the inventive torsion spring assembly is positioned on the belt drive inside the contour of the tensioning arm. The axial length required for the torsion spring assembly is greater than in conventional tensioning devices, but, in respect of the installation conditions, generates fewer problems in the engine compartment. In one embodiment, the torsion spring assembly is clamped in at an axial end in the rack and carries the tensioning arm at the other axial end.

In a first embodiment of the first solution, the torsion spring assembly contains a plurality of individual torsion bars which, by being clamped together at their ends, form a bundle and are in line contact or surface contact with one another. By using such a bundle of torsion bars it is possible to achieve a relatively soft torsion spring for a long spring travel, and, in the case of rotation, inner damping is generated via the surface friction between the individual torsion bars. Under normal circumstances, torsion bars arranged parallel relative to one another are used in an arrangement where they are packed as closely together as possible. However, it is also possible to use modifications as described in detail in the previous German patent application 102 56 402.7 of the applicant which is hereby incorporated by reference. It can be used in the present solution.

A friction unit or damping unit can be articulated at the tensioning arm, which friction or damping unit, in turn, can be supported at the rack. In this way, it is possible to dampen the movements of the tensioning arm.

The bundle of torsion bars can be clamped in at the first end of the torsion spring assembly in a first fixing bush, and it can be clamped in at the second end of the torsion spring assembly in a second bush which is connected in a rotationally fixed way to the supported end of the tensioning arm. The first fixing bush can be bolted in a rotationally fixed way to an engine housing for example or, if the outer circumference is out-of-round, it can be inserted in a positive and form-fitting way into a suitable recess in an engine housing.

According to a further modification, the bundle of torsion bars can be enclosed by a tube which, depending on the method of fixing, can have a supplementary spring function or a supplementary damping function. According to a first variant, the tube, at its two ends, can be connected in a rotationally fixed way to the two ends of the bundle of torsion bars. More particularly, it can be connected in a rotationally fixed way to the first and second bushes and thus form a rotary tube spring connected functionally in parallel relative to the bundle of torsion bars.

According to a second variant, the tube, at its one end, can be connected in a rotationally fixed way to the one end of the bundle of torsion bars and, at its other end, it can be freely rotatable by a limited angular amount relative to the other end of the bundle and, thereafter, can abut against the bundle. In such a case, the tube would became a rotary tube spring which is sequentially connectable to the bundle of torsion bars which, in consequence, increases an initially low spring rate of the torsion bars abutting against the bundle.

According to a further variant, the tube, at is one end, can be connected in a rotationally fixed way to the one end of the bundle of torsion bars and, at its other end, it can be rotatable under friction relative to the other end of the bundle of torsion bars. In this case, the tube forms a friction damping element connected functionally in parallel to the bundle of torsion bars.

One application of the above-mentioned invention provides a belt drive having at least two belt pulleys and a continuous belt with a belt tensioning device of the above-mentioned type. The torsion spring assembly is clamped in axially and in a rotationally fixed way, such as outside the continuous belt, in a rack. In another application, the tensioning arm, in its nominal position, extends approximately parallel to the connection between the axes of rotation of the belt pulleys across which the slack strand extends.

A second solution is provided by a belt tensioning device for a belt drive having at least two belt pulleys and a continuous belt. The device includes a torsion spring assembly with a longitudinal axis $A_2$ and with at least one torsion bar or torsion tube. The torsion spring assembly can be supported axially and radially in a rack. The tensioning device further includes two tensioning arms which, by way of one of their respective ends, are each arranged at the torsion spring assembly so as to be aligned approximately radially relative to the longitudinal axis $A_2$, as well as two tensioning rollers which are rotatably fixed at the respective other ends of the tensioning arms. The axes of rotation $A_1$, $A_3$ of the tensioning rollers extend substantially in parallel with the longitudinal axis $A_2$ of the torsion spring assembly. The tensioning arms are resiliently supported relative to the rack or relative to one another so as to osciliate around the longitudinal axis $A_2$. This second solution is suitable for applications wherein the driving pulley changes in operation. The installation dimensions are as advantageous as in the first solution. In this embodiment, too, the torsion spring assembly is positioned inside the contour of the tensioning arms.

Again, the torsion spring element can contain a plurality of individual torsion bars which, by being clamped together at their ends, form a bundle and are in line contact or surface contact with one another. In this context, too, reference is made to the previous German patent application 102 56 402.7 of the applicant, with the full teaching of same being incorporated by reference herein. It can be applied to this solution as well.

In this embodiment, too, a friction unit or damping unit can be articulated at one of the tensioning arms, which friction unit or damping unit, in turn, can be supported in the rack.

Furthermore, according to a first embodiment utilizing this solution, the torsion spring assembly comprises one single torsion spring unit and is rotatably supported in the rack. One of the tensioning arms is functionally connected to the one end of the torsion spring unit, and the other one of the tensioning arms is functionally connected to the other end of the torsion spring unit. There can thus be achieved a belt tensioning device which can be used if the function between the pulling strand and the slack strand changes in operation. The tensioning arms articulated at the two ends of the torsion spring unit can be pretensioned relative to one another, whereas the torsion spring assembly, as a whole, can be supported rotatably and held so as to be axially fixed in the rack. The torsion spring unit can be formed of torsion bars and a torsion tube which are functionally connected in series, which are arranged coaxially relative to one another and are supported jointly. The support mechanism can extend along the length of the torsion spring assembly.

According to a further embodiment of the second solution, the torsion spring assembly comprises two torsion spring units and is clamped into the rack in a rotationally fixed way. One of the tensioning arms is functionally connected to the first torsion spring unit, and the other one of the tensioning arms is functional connected to the second torsion spring unit. The torsion spring assembly comprises two functionally independent tensioning arms and the torsion spring assembly itself is clamped into the rack in a rotationally fast way. The two torsion spring units can be provided in the form of a combination of torsion bars on the one hand, and in the form of a torsion tube on the other hand, which are positioned coaxially inside one another and are clamped in jointly. Clamping in is preferably effected at the end of the torsion spring assembly which is positioned opposite the tensioning arms.

The advantages in respect of small installation dimensions manifest themselves in both the above-mentioned embodiments of the torsion spring assembly.

In another aspect of the invention, the bundle of torsion bars is clamped in at the first end of the torsion spring assembly in a connecting bush and the bundle of torsion bars is clamped in at the second end of the torsion spring assembly in a bush which is connected in a rotationally fixed way to the first end of the one tensioning arm. There is thus formed a rotary tube spring functionally connected in series to the bundle of torsion bars. The bundle of torsion bars can also be enclosed by a tube which, at its one end, is connected in a rotationally fixed way to the connecting bush and, at its other end, it is connected in a rotationally fixed way to the second tensioning arm. There is formed an independent rotary tube spring in addition to the torsion bar spring.

In the case of both of the foregoing examples, between the first tensioning arm and the second tensioning arm, friction damping elements can be effectively inserted, such as plate springs, and friction discs can be arranged between the two tensioning arms.

A first application of the second solution provides a belt drive having at least two belt pulleys and a continuous belt with a belt tensioning device of said type, wherein the torsion spring assembly is rotatably supported in a rack, wherein a first tensioning arm is connected in a rotationally fixed way to one end of a torsion spring unit and wherein the other tensioning arm is connected in a rotationally fixed way to the other end of the torsion spring unit.

An alternative application provides a belt drive having at least two belt pulleys and a continuous belt with a belt tensioning device of said type. The torsion spring unit is clamped into a rack in a rotationally fixed way, and a first tensioning arm is connected in a rotationally fixed way to a first torsion spring unit, with the other tensioning arm being connected in a rotationally fixed way to a second torsion spring unit. Assembly preferably takes place in such a way that the torsion spring unit is arranged outside the continuous belt, and the first tensioning arm, in its nominal position, extends parallel to the connection through the axes of rotation of two first belt pulleys, and the second tensioning arm, in its normal position, extends parallel to the connection through the axes of rotation of one of the two above-mentioned belt pulleys and a further belt pulley.

The present invention also provides a compact belt tensioning device of the above-mentioned type with improved characteristics. On the one hand, the device is suitable for belt drives of the conventional type with an unchanged driving pulley and, on the other hand, it is suitable for belt drives with a changing driving pulley.

A third solution provides a belt tensioning device for a belt drive having at least two belt pulleys and a continuous belt. The device includes a torsion spring assembly with a longitudinal axis $A_2$ and with at least one torsion bar. The torsion spring assembly can be clamped axially and in a rotationally fixed way into a rack. The belt tensioning device further includes a tensioning arm which, by way of its one end, is arranged at the torsion spring assembly so as to be aligned approximately radially relative to the longitudinal axis $A_2$, as well as a tensioning roller which is rotatably fixed at the other end the tensioning arm. The axis of rotation $A_1$ of the tensioning roller extends substantially parallel relative to the longitudinal axis $A_2$ of the torsion spring assembly, and the tensioning arm is resiliently supported relative to the rack so as to oscillate around the longitudinal axis $A_2$. The at least one torsion bar is enclosed by a tube in whose end arranged opposite the tensioning arm, there is secured in a rotationally fixed way the respective end of the at least one torsion bar and in whose other end the tensioning arm is supported in a radial bearing. The tensioning arm is connected in a rotationally fixed way to the other end of the at least one torsion bar and wherein the central plane of movement E of the tensioning roller is positioned in the central region of said radial bearing. There is thus provided a device which, in the bearing region between the rocker arm or tensioning arm carrying the tensioning roller and the tube which ensures that the assembly is fixed directly to a rack, i.e. more particularly to an engine block, is free from transverse forces and bending moments. It is thus possible to avoid the influence of bending in the bearing region of the tensioning arm, so that permanent functioning of the bearing is ensured, clean movements of the tensioning arms and tensioning rollers are guaranteed, and an increase in wear or friction in the bearing can be avoided. The central plane of movement is identical with the central roller plane which, in accordance with the invention, should be positioned in the central region of the axial length of the bearing, more particularly as centrally as possible relative to the axial length of said bearing.

In one embodiment of this solution, the torsion spring assembly comprises a plurality of individual torsion bars which, by being clamped together at their ends, form a bundle and are in line contact or surface contact with one another. It is thus possible to achieve inner damping of the torsion spring and to set the required damping rate.

According to a further embodiment, the bundle of torsion bars is clamped in at the first end of the torsion spring assembly in a first bush which is firmly connected to the respective end of the tube. The entire bundle, more particularly, is positively and form-fittingly inserted into an opening in the bush.

The bundle of torsion bars can also be clamped in at the second end of the torsion spring assembly into a second bush which is connected in a rotationally fixed way to the one end of the tensioning arm and which is rotatably supported relative to the tube. In this embodiment, too, the connection can be the form-fitting type between a through-aperture in the bush and the bundle of torsion bars.

In addition to the damping mechanism in the torsion spring, it is possible, between the tensioning arm and tube, to insert a friction damping element of any type. The friction damping element can be arranged inside or outside the tube.

According to a fourth solution, the present invention provides a belt tensioning device for a belt drive having at least two belt pulleys and a continuous belt. The device includes a torsion spring assembly with a longitudinal axis $A_2$, and with at least one torsion bar. The torsion spring assembly can be supported axially and radially in a rack. The belt tensioning device further includes two tensioning arms which, by way of their respective one ends, are arranged at the torsion spring assembly so as to be aligned approximately radially relative to the longitudinal axis $A_2$, as well as two tensioning rollers which are rotatably fixed at the respective other ends of the tensioning arms. The axes of rotation $A_1$, $A_3$ of the tensioning rollers extend substantially parallel relative to the longitudinal axis $A_2$ of the torsion spring assembly, and the tensioning arms are resiliently supported with respect to one another so as to oscillate around the longitudinal axis $A_2$. At least one torsion bar is enclosed by a tube in whose end opposed to the tensioning arms there is secured in a rotationally fixed way the respective end of the at least one torsion bar. On the other end of the tube, there is secured in a rotationally fixed way one of the tensioning arms and, the other one of the tensioning arms is supported in a radial bearing. The tensioning arm is connected in a rotationally fixed way to the other end of the at least one torsion bar, and the central plane of movement E of the tensioning rollers is positioned in the central region of the radial bearing.

For the application of a belt tensioning device with two tensioning rollers in the case of which the rocker or tensioning arms are pretensioned so as to be resilient relative to one another, the inventive solution provides a design according to which the bearing between one of the tensioning arms and the tube which, in turn, holds the other one of the tensioning arms, is held so as to be free from transverse forces and bending moments. And, again, it is ensured that the bearing is permanently able to carry out is function in a low-friction and wear-free way and that, to that extent, the tube and a bush connected to the tensioning arm and supported in the tube do not have to have excessively large dimensions. Again, the central plane of movement is identical to the central plane of the two tensioning rollers; it should be positioned inside the axial length of the bearing, more particularly as centrally as possible relative to the axial length of the bearing.

According to an embodiment of this solution, the torsion spring assembly comprises a plurality of individual torsion bars which, by being clamped together at their ends, form a bundle and are in line contact or surface contact with one another. The bundle of torsion bars can be clamped in at the first end of the torsion spring assembly in a first bush which is firmly connected to the tube and which, furthermore, can be clamped in at the second end of the torsion spring assembly in a second in a rotationally fixed way to the first end of the one tensioning arm and is rotatably supported relative to the tube.

Between the first tensioning arm and the second tensioning arm, it is possible to insert friction damping elements, more particularly sleeve damping elements arranged inside or outside the tube.

The tube providing a connection with a rack, more particularly with an engine block, can be supported directly in a bearing region of the engine block or, in one embodiment, it can be rotatably supported in a sleeve which can then be directly clamped into or bolted to the rack. The sleeve should be screwed into or bolted to the rack in the vicinity of the central plane of movement of the tensioning rollers. The tensioning arm connected in a rotationally fixed way to the one end of the tube can be embraced in a yoke-like way by the tensioning arm connected to the bundle of torsion springs. At least one of the tensioning arms, but preferably both, can comprise two halves whose dividing plane corresponds approximately to the central pane of movement of the tensioning rollers and tensioning arms. Each of the two halves can form a bearing region for the journal of one of the tensioning rollers.

A fifth solution provides a belt tensioning device for a belt drive having at least two belt pulleys and a continuous belt, with the device including two torsion spring assemblies with longitudinal axes $A_2$, $A_4$ extending parallel relative to one another and each having at least one torsion bar or torsion tube which can be supported axially and radially in a rack. The torsion spring assemblies each having a tensioning arm which, by means of its one end, is aligned approximately radially relative to the longitudinal axis $A_2$, $A_4$ and arranged at the respective torsion spring assembly; as well as each having a tensioning roller which is rotatably fixed at the respective other end of the tensioning arm. The axes of rotation $A_1$, $A_3$ of the tensioning rollers extend substantially parallel relative to the longitudinal axes $A_2$, $A_4$ of the torsion spring assemblies, and the torsion spring assemblies are coupled to one another so as to be rotatable either in the same direction or in opposite directions. It is thus possible to provide a belt tensioning device which, substantially, comprises two units in accordance with the third solution and embodiments, but in respect of its installation in the rack and its function, it largely corresponds to the device in accordance with the fourth solution and embodiments. Two substantially tube- or bar-shaped torsion spring assemblies can be inserted in parallel relative to one another so as to save space. In an axial view, they are positioned inside the contour of the two tensioning arms which, in this embodiment, do not overlap. The fifth solution refers to applications with a driving pulley changing in operation, thus providing greater freedom in respect of the topology of the belt drive. To the extent that the torsion spring assemblies are coupled to one another so as to rotate in the same direction, the tensioning rollers can both act from the outside on to the continuous belt. If the torsion spring assemblies are coupled to one another so as to rotate in opposite directions, one of the tensioning arms with its tensioning rollers can act from the outside on the belt, and the other one of the tensioning arms with its tensioning roller can act from the inside on the belt. In both cases, when the driving pulley changes, as a result of the synchronous rotation of the torsion spring assemblies, the slack strand is tensioned by the tensioning roller and the load on the pulling strand is relieved by the other tensioning roller.

In the case of this fifth solution, too, according to another embodiment, at least one of the torsion spring assemblies contains a plurality of individual torsion bars which, by being clamped together at their ends, form a bundle and are in line contact or surface contact with one another. In this context, too, reference is made to the previous German patent application 102 56 402.7 of the applicant which is hereby incorporated by reference. It can be applied to this solution, too. At at least one of the tensioning arms there can be articulated a friction or damping unit which can be supported in the rack. The torsion spring assemblies can be coupled to one another by a two-arm crank rocker, and depending on the way in which the arms or the coupler are arranged, it is possible to generate a rotational movement in the same direction or in opposite directions. Alternatively, the torsion spring assemblies can be coupled by a spur gear drive, and depending on whether or not an intermediate gear is used, it is possible to effect rotational movements in the same direction or in opposite directions.

The bundle of torsion bars can be clamped in at the first end of the torsion bar assembly in a fixing bush, and it can be clamped in at the second end in a bush which is connected in a rotationally fixed way to one end of a tensioning arm. The bundle of torsion bars can be enclosed by a tube which, at its ends, is connected in a rotationally fixed way to the two ends of the bundle of torsion bars and forms a rotary tube spring connected functionally in parallel relative to the bundle of torsion bars. The tensioning device according to the fifth solution is used, more particularly, in a belt drive with at least two belt pulleys and a continuous belt, wherein the torsion spring assemblies are rotatably supported in a rack and are coupled so as to be rotatable in the same direction or in opposite directions. The longitudinal axes $A_2$, $A_4$ of the torsion spring assemblies are positioned in an approximately mirror-symmetrical way relative to the angle bisecting plane of an angle which is formed by two tangents to three belt pulleys successively embraced by the belt. At least one of the tensioning arms can be supported by a friction unit or damping unit relative to the rack. In addition to the resilient method of coupling the tensioning arms relative to one another, at least one of the tensioning arms can additionally be spring-suspended relative to the rack by a further spring unit.

The material to be considered for the torsion bars or tubes is steel or fiber-reinforced plastics. The tensioning arms in all solutions can be light metal pressure die castings or formed steel parts. Plastics or steel are suitable materials for the tensioning rollers of all solutions.

Other advantages and features of the invention will become apparent to one of skill in the art upon reading the following detailed description with reference to the drawings illustrating features of the invention by way of example.

BRIEF DESCRIPTION OF DRAWINGS

For a more complete understanding of this invention, reference should now be made to the embodiments illustrated in greater detail in the accompanying drawings and described below by way of examples of the invention.

In the drawings:

FIG. 9 shows the principle of a belt drive with a two-arm belt tensioning device with two torsion spring assemblies in a first embodiment.

FIG. 10 shows the principle of a belt drive with a two-arm belt tensioning device with two torsion spring assemblies in a third embodiment.

FIG. 11 shows the two torsion spring assemblies according to FIG. 9 in a perspective illustration.

DETAILED DESCRIPTION

In the following description, various operating parameters and components are described for several embodiments. These specific parameters and components are included as examples and are not meant to be limiting.

Figure 1:
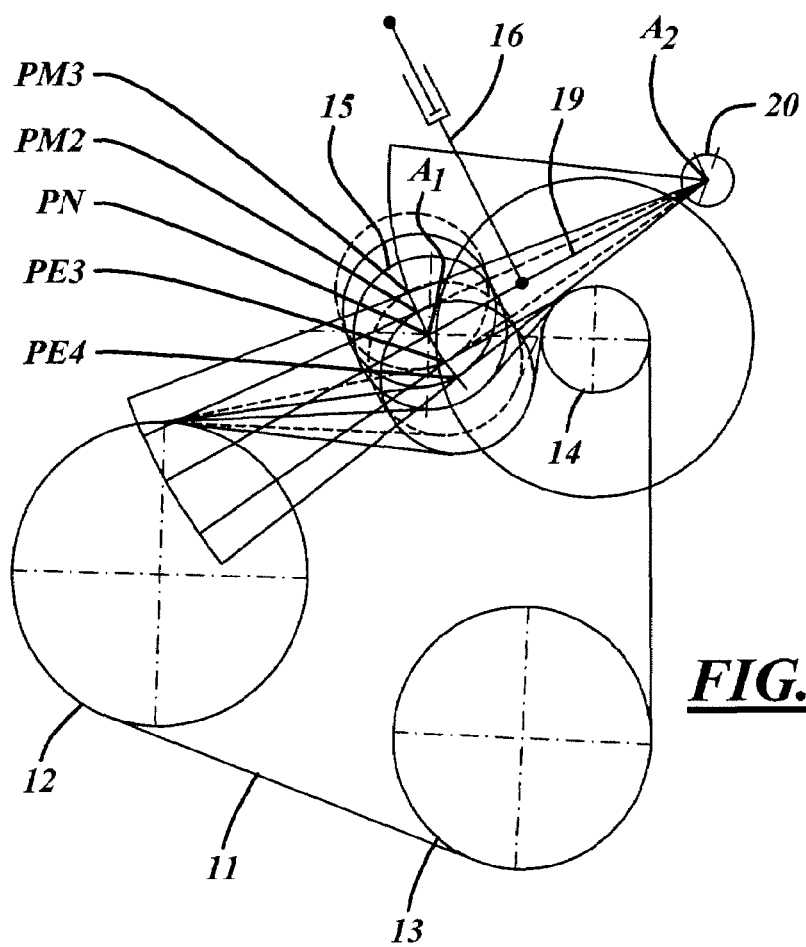
FIG. 1 shows the principle of a belt drive with a one-arm belt tensioning device.

Referring now to the drawings wherein like reference numerals are used to identify similar components in the various views, FIG. 1 illustrates the principle of a belt drive used for an internal combustion engine in an axial view of the crankshaft. A continuous belt 11, such as a multi-groove V-belt or a toothed belt, moves across three inner belt pulleys: a belt pulley 12 which is fitted on the crankshaft and driven by same, and which drives the belt drive; a belt pulley 13, driven by the belt, for a compressor of an air conditioning system; and a belt pulley 14, driven by the belt 11, for an electric generator. The toothed belt rotates clockwise. Between the belt pulley 12 and the belt pulley 14, there extends a slack strand which is loaded by a tensioning roller 15 which is illustrated in different positions with different belt lengths. The tensioning roller 15 is arranged at a tensioning arm 19 so as to be pivotable around an axis of rotation $A_2$ which, at the same time, forms the central axis of a torsion spring assembly 20. The torsion spring assembly 20, at a first end, is secured in a rotationally fixed way to the engine block and, at is other end, carries the tensioning arm 19 with the tensioning roller 15 which is arrange radially relative to the central axis of the torsion spring assembly 20. The tensioning roller 15 is rotatable around an axis of rotation $A_1$ and is in contact with the smooth outer face of the belt. The tensioning arm 19 can be supported by a variable-length steering arm 16 on a rack. The steering arm 16 can comprise damping and/or spring elements. Of the various positions of the tensioning roller 15, the central position PN indicates the nominal position, whereas the adjoining positions PM2 and PE3 constitute tolerance regions, with the outer positions PM3 indicating the new condition prior to an initial rotation and position PE4 indicating an end stop beyond a permissible belt elongation and belt aging.

Figure 2:
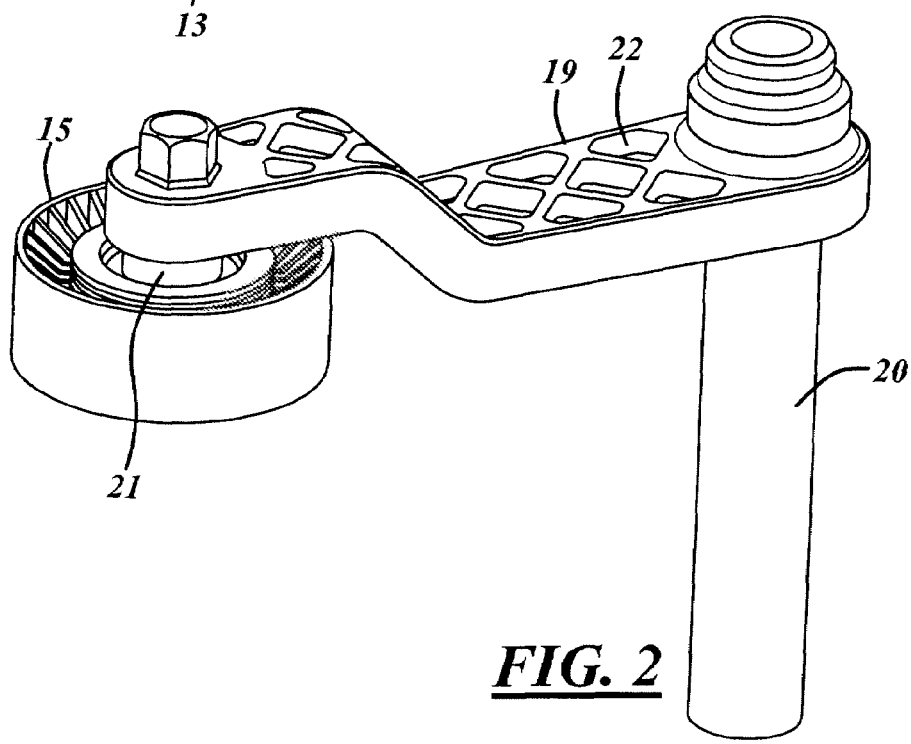
FIG. 2 is a perspective illustration of a belt tensioning device for a belt drive according to FIG. 1.

FIG. 2 shows the inventive belt tensioning device with its main parts with the cylindrical tensioning roller 15 positioned on the smooth outer face of the belt, a tensioning arm 19 and torsion spring assembly 20. The tensioning roller 15 is a lightweight plastic part which is rotatably supported on a bearing journal 21 at the tensioning arm 19. The tensioning arm 19 is a cranked carrier and comprises weight-reducing pockets 22 on one side. The tensioning arm 19 is held in a rotationally fixed way at the upper end of the torsion spring assembly, at its lower end, the torsion spring assembly 20 is secured by means (not shown in detail) in a rotationally fixed way to the engine block.

FIG. 3 shows the same details as FIG. 2 in various views with the same reference numbers. To that extent, reference is made to the description of FIG. 2. The additional details identifiable for the first time with also be explained below with reference to the enlarged FIG. 4.

Figure 3A:
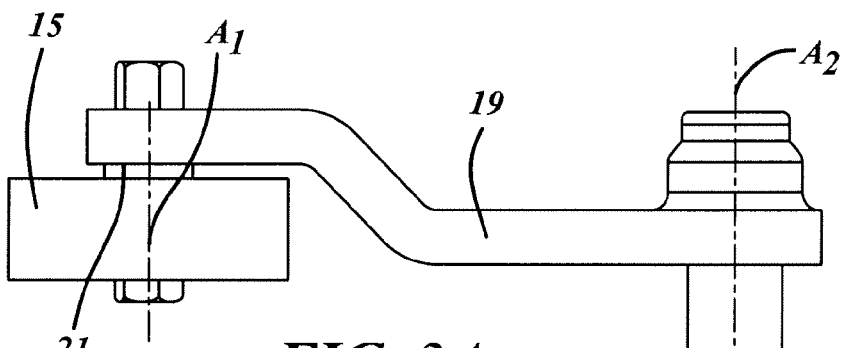
FIG. 3 shows the belt tensioning device according to FIG. 2:
  A) in a side view;
  B) in a section through the axes of rotation;
  C) in a plan view of the axes; and
  D) in a perspective illustration similar to FIG. 2.
Figure 3B:
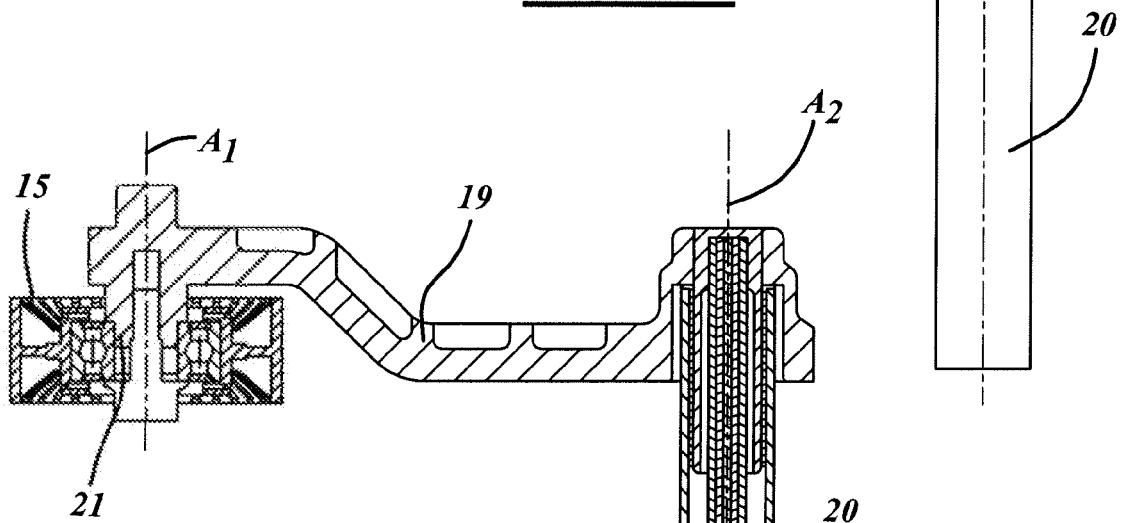
Figure 3C:
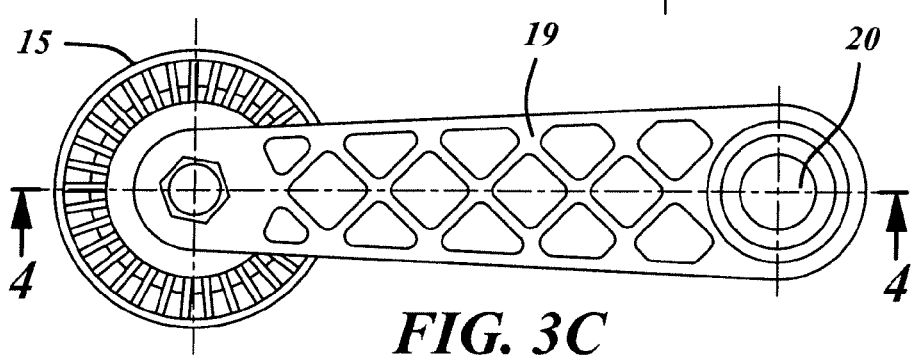
Figure 3D:
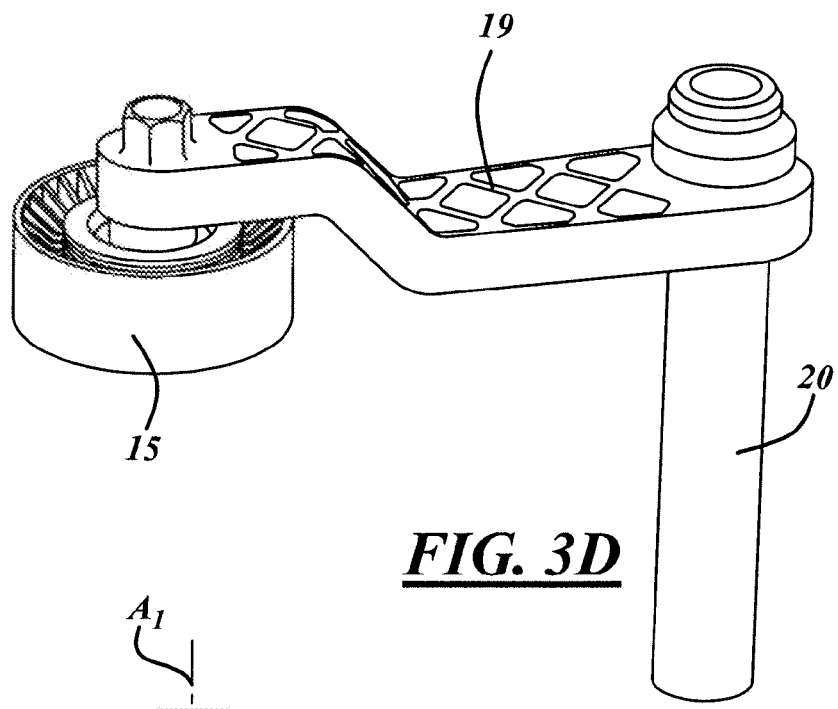
Figure 4:
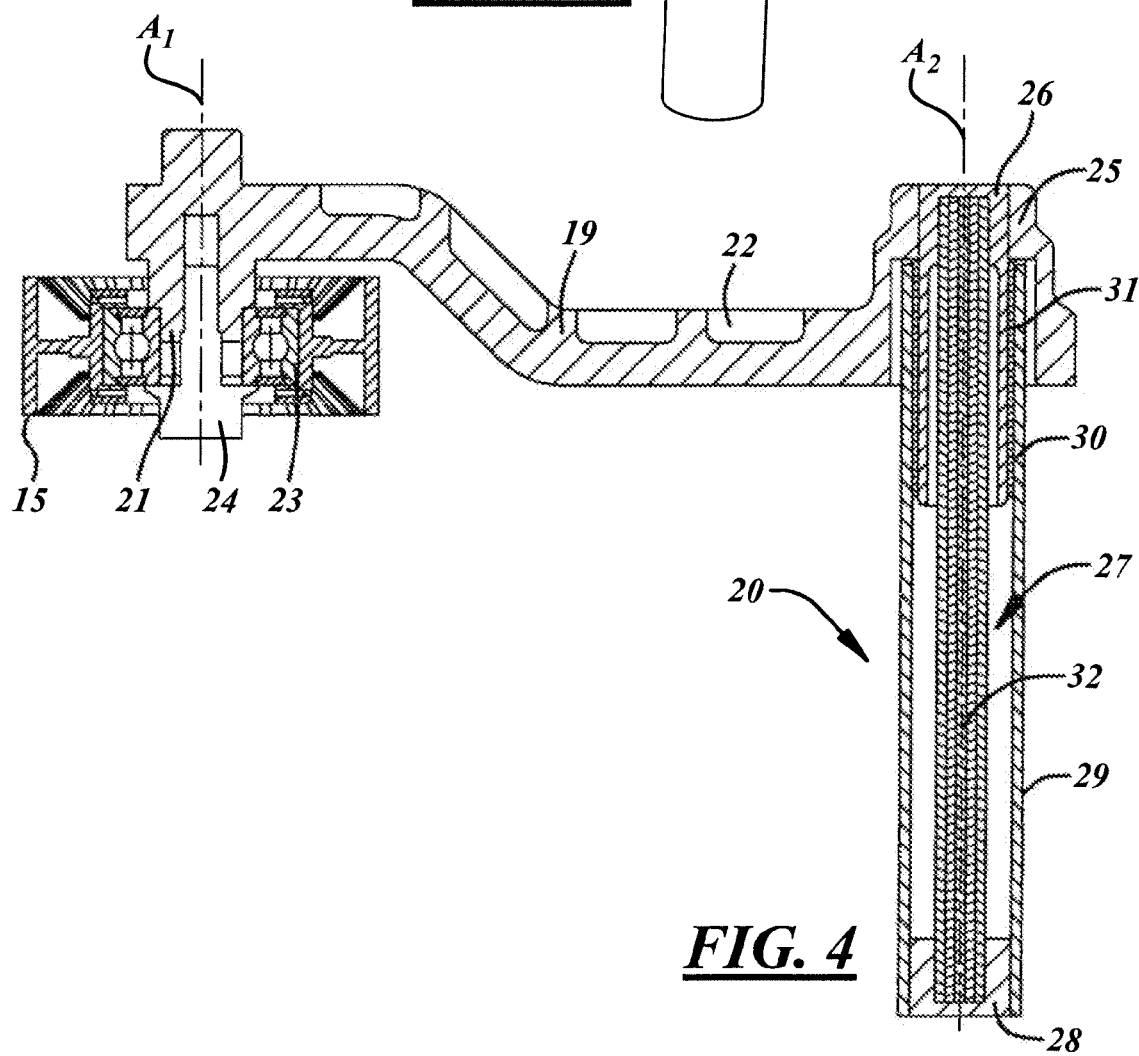
FIG. 4 shows the section according to FIG. 3B in an enlarged illustration.

FIG. 4 shows the complete assembly according to FIG. 3B in a larger scale. It can be seen that the pockets 22 provided for weight-reduction are provided on one side of the tensioning arm 19. One or more of the pockets 22 could also be formed as through apertures. At the free end of the tensioning arm 19, there is shown the bearing journal 21 on which the tensioning roller 15 is rotatably supported by means of a roller bearing 23. The inner bearing race of the bearing is held by a screw 24 on the bearing journal 21. The tensioning roller 15 embraces the outer bearing race of the bearing in a form-fitting and positive way. The tensioning roller is thus rotatable around an axis of rotation $A_1$. At the other end of the tensioning arm 19, there is provided an eye 25 into which there is inserted a first bush 26 in a rotationally fixed way, such as by a press fit. Into the first bush 26, there is inserted one end of a bundle 27 of torsion springs 32, which spring bundle 27, in its entirety, is connected to the first bush 26 in a rotationally fixed way. The other end of the bundle 27 of torsion springs 32 is inserted into a second bush 28, which bundle 27, again, in its entirety, is connected to the second bush 28 in a rotationally fixed way. The above-described end of the tube 29 extends over the lower end of the first bush 26, with sleeves 30, 31 serving different functions being inserted between the tube 29 and the first bush 26. In the fitted condition, the lower end of the torsion spring assembly 20 is clamped into a holding mechanism in a rotationally fixed way, either directly via the second bush 28 or via the outer circumference of the tube 29. Together, the spring bundle 27 and tube 29 can form a torsion spring unit as part of the torsion spring assembly 20. The tensioning arm 19 is thus resiliently rotatable relative to the second bush 28 around the axis $A_2$. If suitably dimensioned, the sleeves 30, 31 can serve as bearing sleeves or friction damping sleeves if the upper end of the tube 29 is rotatable relative to the first bush 26. The sleeves 30, 31 can also be used as rotary stop sleeves for the upper end of the tube 29, if the tube 29 is to serve as a tube spring which is sequentially connectable to the torsion spring bundle 27 and which, from a certain angle of rotation of the torsion spring assembly onwards, is to increase the spring rate. The sleeves 30, 31 can also serve as clamping sleeves which produce a rotationally fixed connection between the upper end of the tube 29 and the first bush 26, so that the tube is connected functionally in parallel to the torsion spring bundle 27, increasing the spring rate over the entire angle of rotation of the torsion spring assembly. As the spring bundle 27, when under torsion, is slightly shortened, the ends of the spring bundle can be held in a rotationally fixed way in at least one of the first and second bushes 26, 28 or in both, but they can be slightly axially displaceable.

As can be seen in FIG. 1, the longitudinal axis $A_2$ of the torsion spring unit 20 is positioned on the angle bisecting plane of an angle which is formed by two tangents to three belt pulleys 12, 13, 14 successively embraced by the belt 11. In a nominal position PN, the tensioning arm 19 extends approximately parallel relative to the connection between the axes of rotation of the two belt pulleys 12, 14 across which there extends a slack strand.

Figure 5:
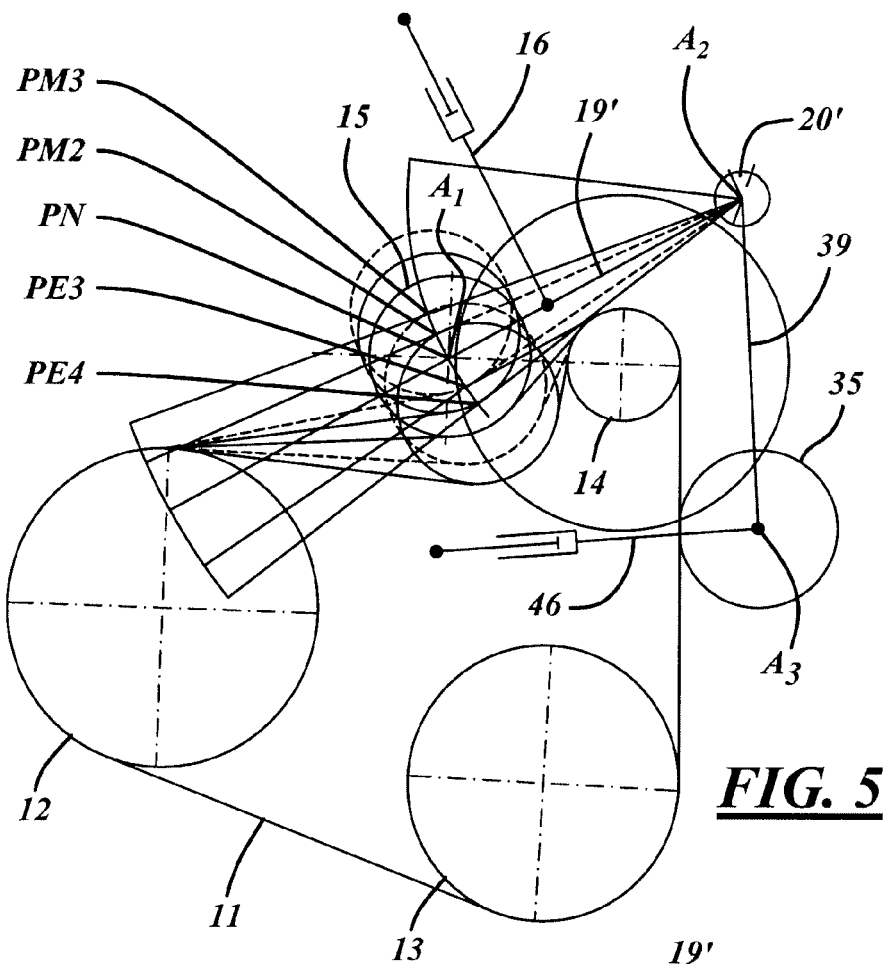
FIG. 5 shows the principle of the belt drive with a two-arm belt tensioning device.

FIG. 5 shows the principle of a belt drive used at an internal combustion engine in an axial view of the crankshaft. A continuous belt 11, more particularly a multi-groove V-belt or a toothed belt, moves over three inner belt pulleys: a belt pulley 12 which is fitted on the crankshaft and driven by same, and which drives the belt drive; a belt pulley 13, driven by the belt, for a compressor of an air conditioning system; and a belt pulley 14, driven by the belt 11, for an electric starter generator. The toothed belt rotates clockwise. In the illustrated mode of engine operation, the slack strand which is loaded by a first tensioning roller 15 which is rotatable around an axis of rotation $A_1$ and illustrated in different positions with different belt lengths. The first tensioning roller 15 extends between the belt pulley 12 and the belt pulley 14. The first tensioning roller 15 is arranged at a first tensioning arm 19' so as to be pivotable around an axis of rotation $A_2$ which, at the same time forms the central axis of a torsion spring assembly 20'. By means of a first variable-length steering arm 16, the tensioning arm 19' can be supported on a rack. The steering arm 16 can comprise damping and/or spring elements. Between the belt pulley 13 and the belt pulley 14, there extends a portion of the pulling strand which is loaded by a second tensioning roller 35 which is rotatable around an axis of rotation $A_3$ and is positioned on the tensioned belt 11. The second tensioning roller 35 is arranged at a second tensioning arm 39 so as to be pivotable around the axis of rotation $A_2$ which has already been mentioned. The second tensioning arm 39 is supported relative to the rack by a second variable-length steering arm 46 which can comprise damping and/or spring elements. Both tensioning arms 19, 39 are rotationally resiliently coupled to one another via the torsion spring assembly 20' which is freely rotatable around the axis of rotation $A_2$. The torsion spring assembly can be fitted between the tensioning arms with a spring-pretension. In the mode of starter operation (not illustrated), the pulling strand extends between the belt pulley 14 and the belt pulley 12, whereas the belt between the belt pulley 13 and the belt pulley 14 becomes the slack strand. When operation changes to the starter operation, the positions of the tensioning rollers 15 and 35 are exchanged accordingly; the tensioning roller 15 is then positioned on the tensioned pulling strand, whereas the tensioning roller 35 tensions the slackened strand inwardly. The tensioning rollers 15, 35 are in contact with the smooth outer face of the belt. Of the various positions of the first tensioning roller 15, the central position PN indicates the nominal position during engine operation, whereas the adjoining positions PM2 and PE3 constitute tolerance regions, with the outer positions PM3 indicating the new condition prior to an initial rotation and position PE4 indicating an end stop beyond a permissible belt elongation and belt aging.

Again, the torsion spring assembly 20' is arranged outside the belt 11, and in its nominal position PN, the first tensioning arm 19' extends approximately parallel relative to the axes of rotation through the first two pulleys 12, 14. In its nominal position, the second tensioning arm 39 extends approximately parallel relative to the axes of rotation through the next two pulleys 14 and 13.

Figure 6:
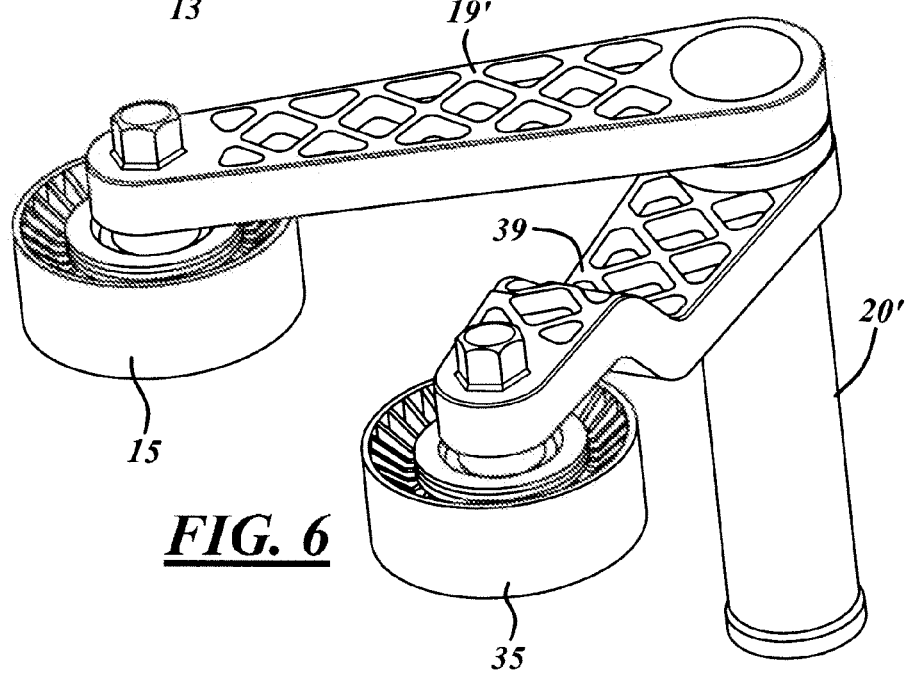
FIG. 6 shows a perspective illustration of a belt tensioning device for a belt drive according to FIG. 5.

FIG. 6 shows the inventive belt tensioning device with its major components with the first tensioning roller 15, the first tensioning arm 19', the second tensioning roller 35, the second tensioning arm 39 and a torsion spring assembly 20. The rollers are advantageously made of lightweight plastic parts which are rotatably supported at the ends of their tensioning arms 19', 39. The first tensioning arm 19' is a straight carrier which is held in a rotationally fixed way at the upper end of the torsion spring assembly. The second tensioning arm 39 is a cranked beam which is held below the first one on the torsion spring assembly 20' in such a way that the tensioning rollers 15, 39 run in one plane. The torsion spring assembly 20' is preferably supported in such a way that it is freely rotatable in the engine block.

FIG. 7 shows the same details as FIG. 6 with the same reference numbers. To that extent, reference is made to the previous description. The additional details first shown in FIG. 7B will be explained below with reference to the larger-scale FIG. 8 of the same contents.

Figure 7A:
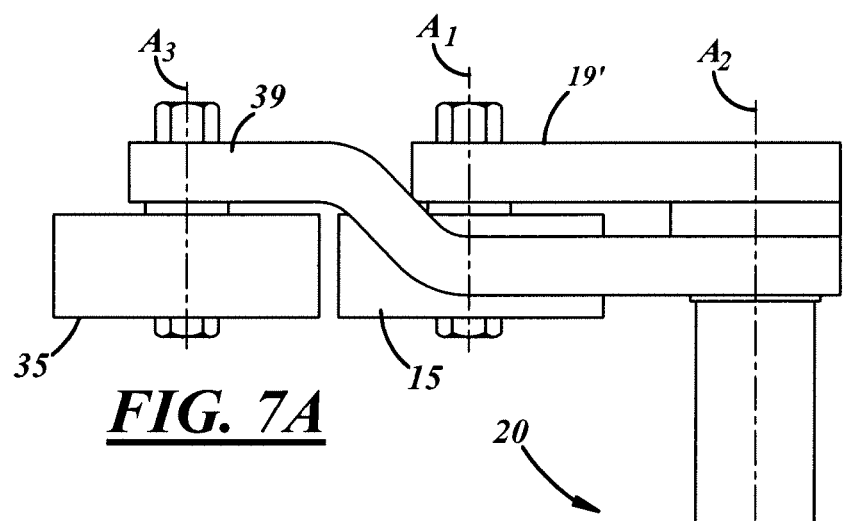
FIG. 7 shows the belt tensioning device according to FIG. 6:
A) in a side view;
B) in a section through the axes of rotation;
C) in a plan view of the axes; and
D) in a perspective view similar to FIG. 6.
Figure 7B:
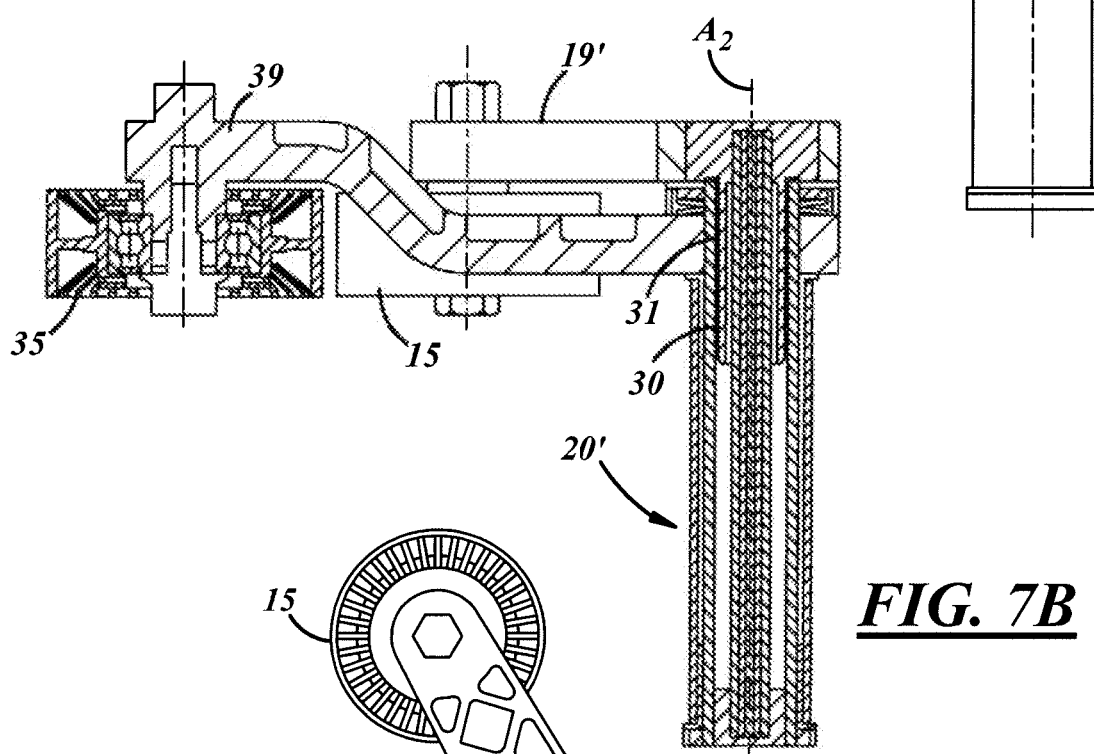
Figure 7C:
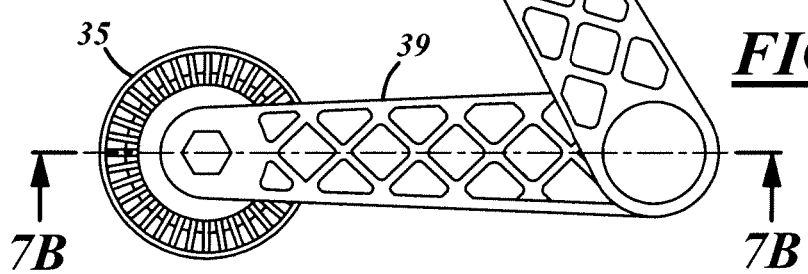
Figure 8:
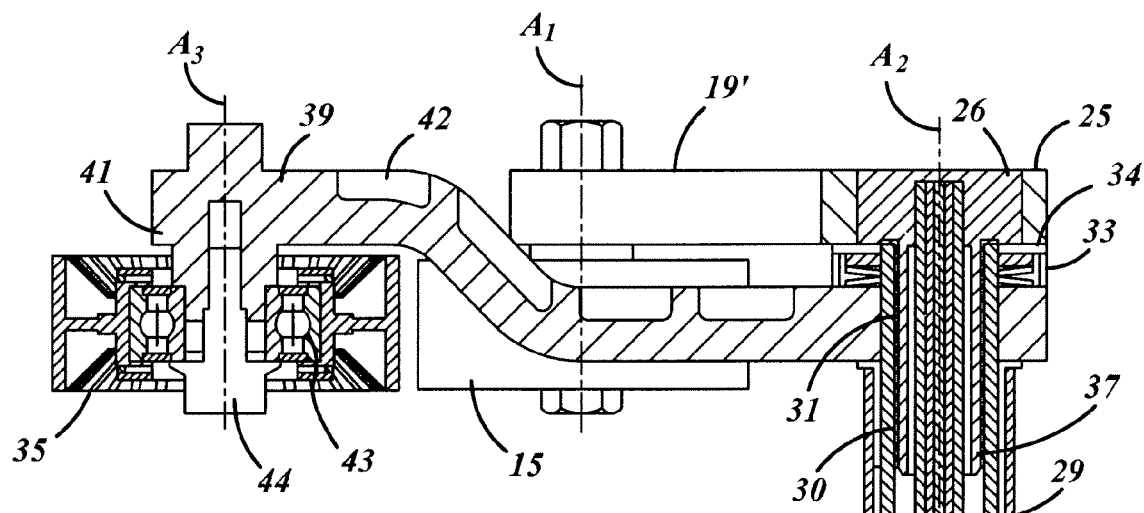
FIG. 8 shows the section according to FIG. 7B in an enlarged illustration.
Figure 7D:
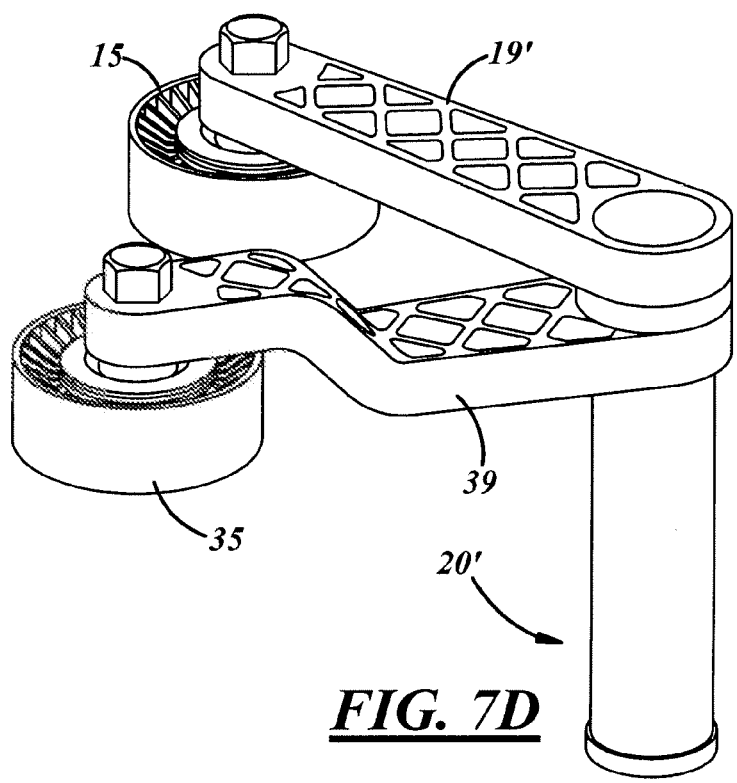

FIG. 8 shows the complete assembly according to FIG. 7B in a larger scale. The first tensioning arm 19' with the first tensioning roller 15 is shown in section in the region of the torsion spring assembly 20' only, whereas the second tensioning arm 39 with the second tensioning roller 35 is shown in section in the center. It can be seen that the pockets 42 provided for weight-reducing purposes are provided on one side of the first tensioning arm 19 although, again, they could be through-apertures. At the free end of the second tensioning arm 39, there is shown the bearing journal 41 on which the second tensioning roller 35 is rotatably supported by means of a roller bearing 43. The inner bearing race of the bearing 43 is held by a screw 44 on the bearing journal 41. The second tensioning roller 35 embraces the outer bearing race of the bearing 43 in a form-fitting and positive way. The second tensioning roller 35 is thus rotatable around an axis of rotation $A_2$. At the sectioned end of the first tensioning arm 19', there is provided an eye 25 into which there is inserted a first bush 26 in a rotationally fixed way. Into the first bush 26, there is inserted one end of a bundle 27 of torsion springs 32, which spring bundle 27, in its entirety, is connected to the first bush 26 in a rotationally fixed way The other end of the bundles 27 of torsion springs 32 is inserted into a second bush 28, which bundles 27, again, in its entirety, is connected to said second bush 28 in a rotationally fixed way. A tube 29 connected to the second bush 28 in a rotationally fixed way is placed onto the first and second bushes 26, 28. The above-described end of the tube 29 extends over the lower end of the fist bush 26, with sleeves 30, 31 being inserted between the tube 29 and the first bush 26. If dimensioned accordingly, the sleeves 30, 31 can serve as bearing sleeves or friction damping sleeves. The second tensioning arm 39 is placed in a rotationally fixed way onto the upper end of the tube 29. The second tensioning arm 39 is supported axially downwardly via a spacing sleeve 40 which is positioned on a flange 38. Between the tube 29 and the spacing sleeves 40, there are positioned centering sleeves 36, 37. The second tensioning arm 39 is supported upwardly via plate springs 33 and friction discs 34 on the first tensioning arm 19', which plastic springs 33 and friction discs 34, together, form a friction damping unit. In this way, the bundle 27 of torsion springs 32 and the tube 29 form spring units which are connected functionally in series which can be incorporated under a respective pretension relative to the belt. If, alternatively, the second bush 28 and the lower end of the tube 29 are firmly clamped into holding mechanism, the first tensioning arm 19' with the first tensioning roller 15 is supported via the bundle 27 on the holding mechanism and, independently thereof, the second tensioning arm 39 with the second tensioning roller 35 is supported via the tube spring 29 on the holding mechanism. As the spring bundle 27, when under torsion, is slightly shortened, the ends of the spring bundle 27 can be held in a rotationally fixed way in at least one of the first and second bushes 26, 28 or in both, but they can be slightly axially displaceable.

FIGS. 9 and 10 will initially be described jointly. A continuous belt 11, such as a multi-groove V-belt or toothed belt, moves over three inner belt pulleys 12, 13, 14: a belt pulley mounted on the crankshaft, driven thereby and driving the belt 11; a belt pulley 13 driven by the belt 11 and intended for a compressor of an air conditioning system for example and a pulley 14 driven by the belt 11 and intended for an electric starter generator. The toothed belt circulates clockwise. In the mode of operation of the internal combustion engine, the slack strand extends between the belt pulley 12 and the belt pulley 14 and is loaded by a first tensioning roller 15. Unlike FIGS. 1 and 5 wherein the tensioning roller 15 is shown in different positions with different belt lengths, only one position is shown in FIGS. 9 and 10 although it is to be understood that the first roller 15 will operate in various positions. The first tensioning roller 15 is arranged at a tensioning arm 19 so as to be pivotable around an axis of rotation $A_2$ which, at the same time, forms the central axis of a fist torsion spring assembly $20_1$. Between the belt pulley 13 and the belt pulley 14, there extends a portion of the pulling strand which is loaded by a second tensioning roller 35 and is positioned on the tensioned belt 11. The second tensioning roller 35 is arranged at a second tensioning arm 39 so as to be pivotable around an axis of rotation $A_4$ which, at the same time, forms the central axis of a second torsion spring assembly $20_2$. The axes of rotation $A_2$, $A_4$ are positioned parallel relative to one another and perpendicularly relative to the drawing plane. The longitudinal axes $A_2$, $A_4$ of the torsion spring assemblies $20_1$, $20_2$ are positioned in an approximate mirror-image-like way relative to the angle bisecting plane of an angle which is formed by two tangents to the three belt pulleys 12, 13, 14 successively embraced by the belt 11.

In FIG. 9, the second tensioning roller 35 is positioned on the inside of the belt at the pulling strand. The two torsion spring assemblies $20_1$, $20_2$ are coupled in such a way that they can be rotated in the rack in opposite directions relative to one another. In the operational mode of the starter (not illustrated), the pulling strand extends between the belt pulley 14 and the belt pulley 12, whereas the belt between the belt pulley 13 and the belt pulley 14 becomes the slack strand. The first tensioning arm 19 pivots clockwise and the second tensioning arm 39 pivots counter-clockwise, so that the second tensioning roller 35 tensions the slack strand outwardly.

In FIG. 10, the second tensioning roller 35 is positioned on the outer face of the belt 11. Both torsion spring assemblies $20_1$, $20_2$ are coupled relative to one another in such a way that, at the pulling strand, they are rotatable in the rack in the same direction. In this case, too, in the operating mode of the starter, which is not illustrated, the pulling strand extends between the belt pulley 14 and the belt pulley 12, whereas the belt between the belt pulley 13 and the belt pulley 14 becomes the slack strand. The first tensioning roller 15 is then positioned on the tensioned pulling strand, whereas the second tensioning roller 35 tensions the slackened strand inwardly.

Figure 12:
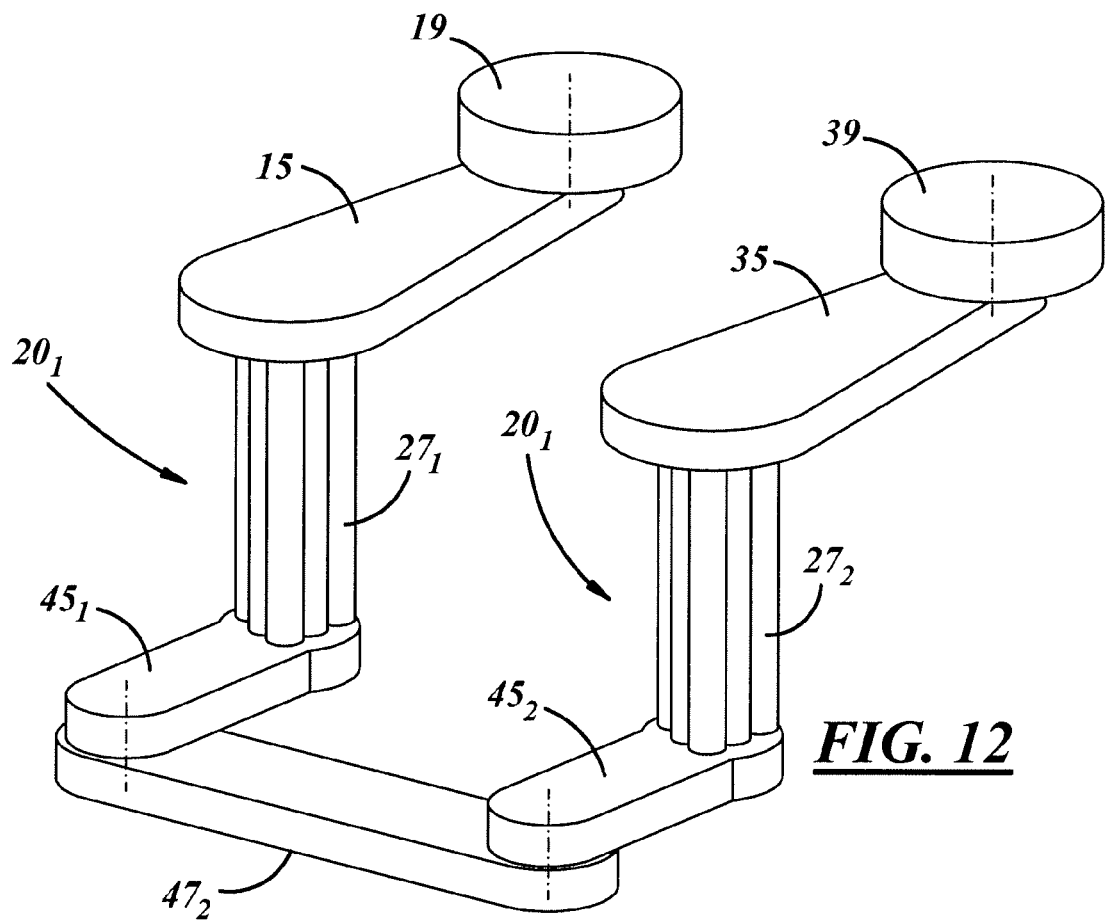
FIG. 12 shows the two torsion spring assemblies according to FIG. 10 in a perspective view.

FIGS. 11 and 12 will be described jointly below. They show the design principle and the way in which the two torsion spring assemblies $20_1$, $20_2$ according to FIGS. 9 and 10 are coupled. FIG. 11 shows the rotatability in the opposite direction according to FIG. 9 and FIG. 12 the rotatability in the same direction according to FIG. 10. The torsion spring assemblies $20_1$, $20_2$ each include a bundle $27_1$, $27_2$ of torsion bars at whose first ends there are articulated tensioning arms 19, 39 with tensioning rollers 15, 35 and at whose second ends there are articulated crank arms $45_1$, $45_2$ which are connected to one another via a coupler 47.

FIG. 11 shows the first and second crank arms $45_1$, $45_2$ arranged in parallel relative to one another and arranged radially at the spring bundles 27 in opposite directions (anti-parallel), so that the coupler $47_1$ forces the torsion spring assemblies $20_1$, $20_2$ to be rotatable in opposite directions.

In FIG. 12, the first and second crank arms $45_1$, $45_2$ are arranged radially at the torsion spring assemblies $20_1$, $20_2$ in the same direction and in parallel, so that the coupler $47_2$ forces the torsion spring assemblies $20_1$, $20_2$ to be rotatable in the same direction.

A relative pretension can be generated between the first and second tensioning arms 19, 39 by deforming the bundles of torsion springs while being incorporated into the belt tensioning device. The torsion spring assemblies as such have to be supported rotatably.

Figure 13:
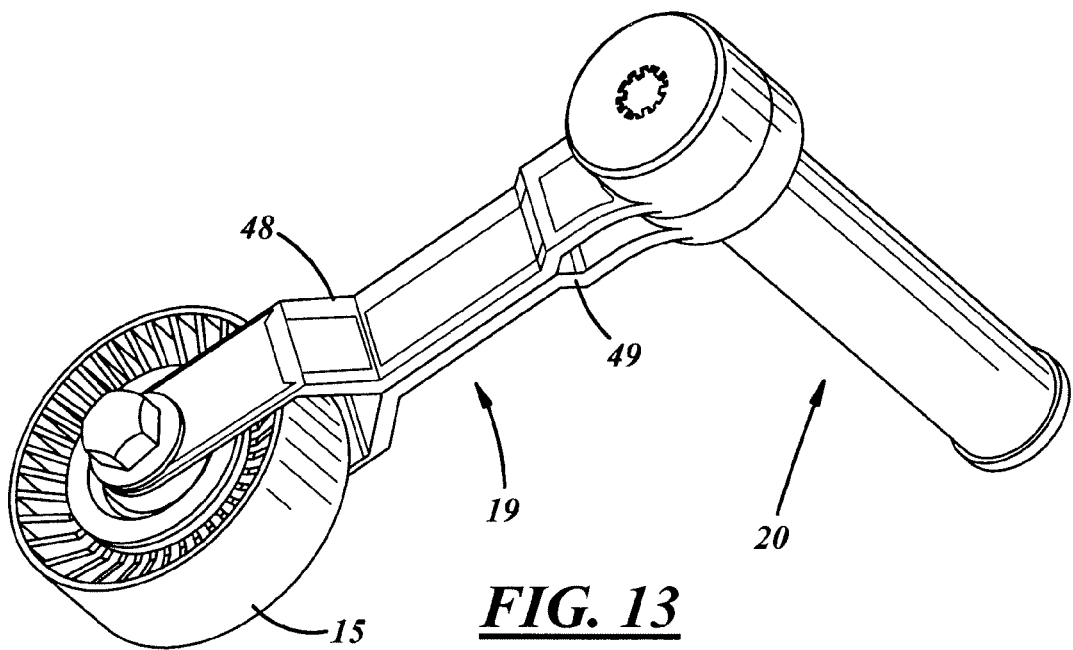
FIG. 13 shows a perspective illustration of a one-arm belt tensioning device for a belt drive in a further embodiment.

FIG. 13 shows a further inventive belt tensioning device with a cylindrical tensioning roller 15, a tensioning arm 19 and a torsion spring assembly 20. The tensioning arm 19 comprises two halves 48, 49 whose dividing plane is positioned approximately in the central plane of movement of the roller and tensioning arm respectively, each forming a bearing region for the tensioning roller 15. Further details can be gathered from the following Figure.

Figure 14:
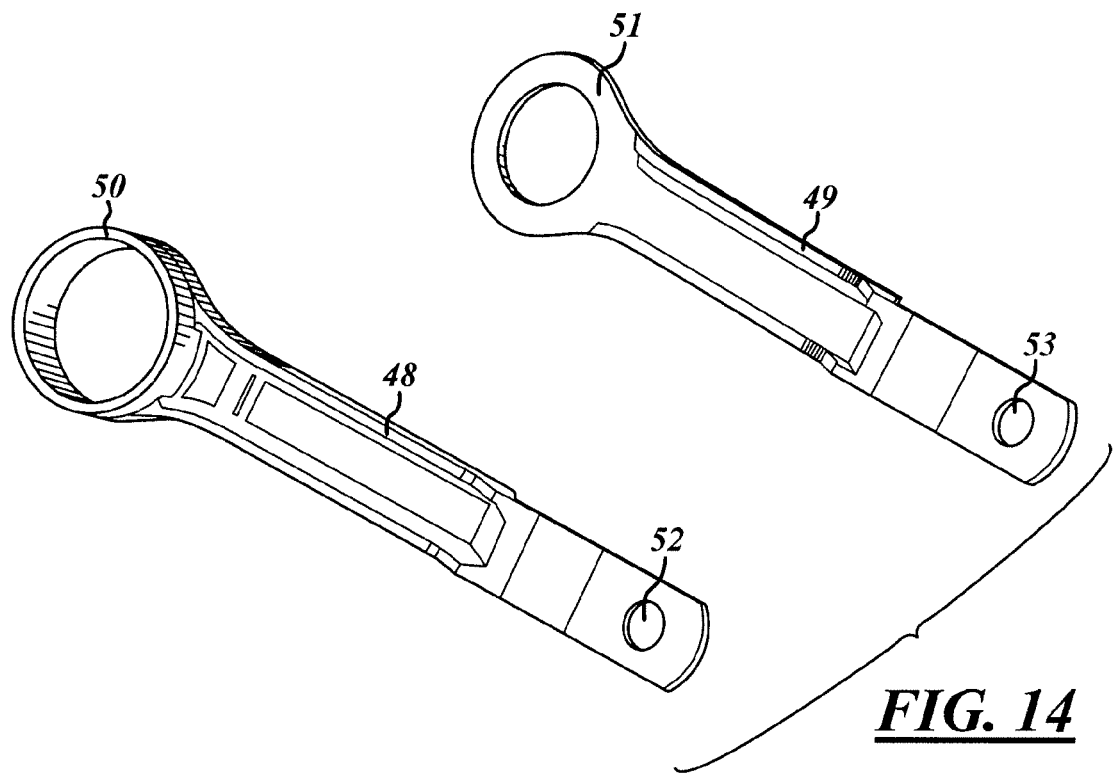
FIG. 14 shows a perspective view of the two halves of the tensioning arm of the device according to FIG. 13.

FIG. 14 shows two arm halves 48, 49 of which the first one comprises a bush or sleeve 50 and the second one a flat eye 51. The halves 48, 49 are connected to one another in such a way that the sleeve 50 and the eye 51 jointly form the eye 25 and can be slipped onto the torsion spring assembly 30. At the same time, each of the halves shows a bearing region 52, 53 which with the halves being connected to one another receive the journal for the tensioning roller 15.

Figure 15:
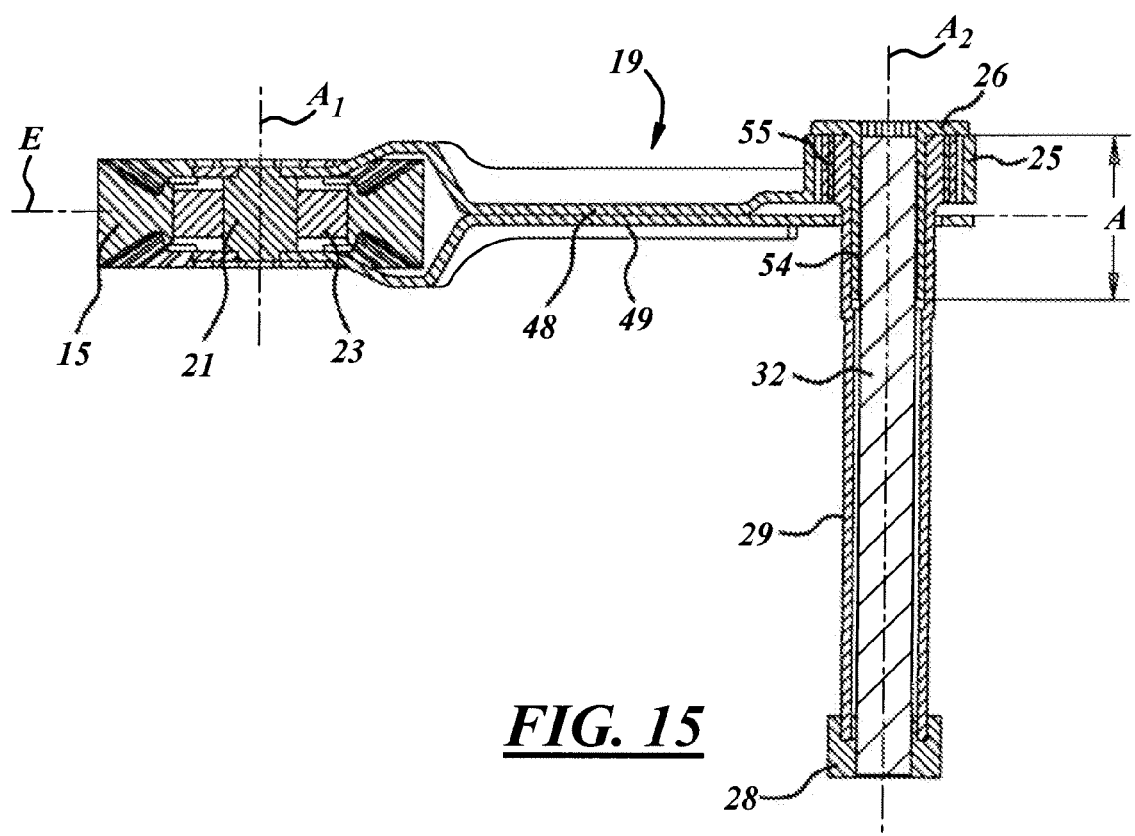
FIG. 15 shows the belt tensioning device according to FIG. 13 in a section through the axes of rotation.

FIG. 15 shows in greater detail the design of the assembled tensioning arm 19 comprising the two arm halves 48, 49. A bearing journal 21 is inserted into the bearing aperture prior to the two halves 48, 49 being assembled. The tensioning roller 15 is rotatably supported in the tensioning arm 19 by way of a roller bearing 23 not shown in detail. At the opposite end, the sleeve 50, at its end face, is connected in a rotationally fixed way to a first bush 26 which is rotatably inserted into a tube 29 and forms a bearing 54 therewith. A torsion spring assembly 32, by means of its upper end, is inserted in a rotationally fixed way into the first bush 26. The lower end of the torsion spring 32 is inserted in a rotationally fixed way into a second bush 28. The tube 29 is axially connected in a rotationally fixed way to the second bush 28. Between the sleeve 50 and the upper end of the tube 29 there is shown a multi-component sleeve which can form a friction damping element 55 between the eye 25 and the upper end of the tube 29. In accordance with the invention, the central plane of the movement E of the tensioning roller 15 and of the tensioning arm 19, which, at the same time, forms the diving plane between the halves 48 and 49, is positioned within the axial region A of the bearing 54. More particularly, the plane E is positioned approximately centrally relative to the axial length A of the bearing 54. The bearing 54 between the tensioning arm 19 and the tube 29 is thus free from transverse forces and bending moments, so that optimum functioning of the bearing is ensured.

Figure 16:
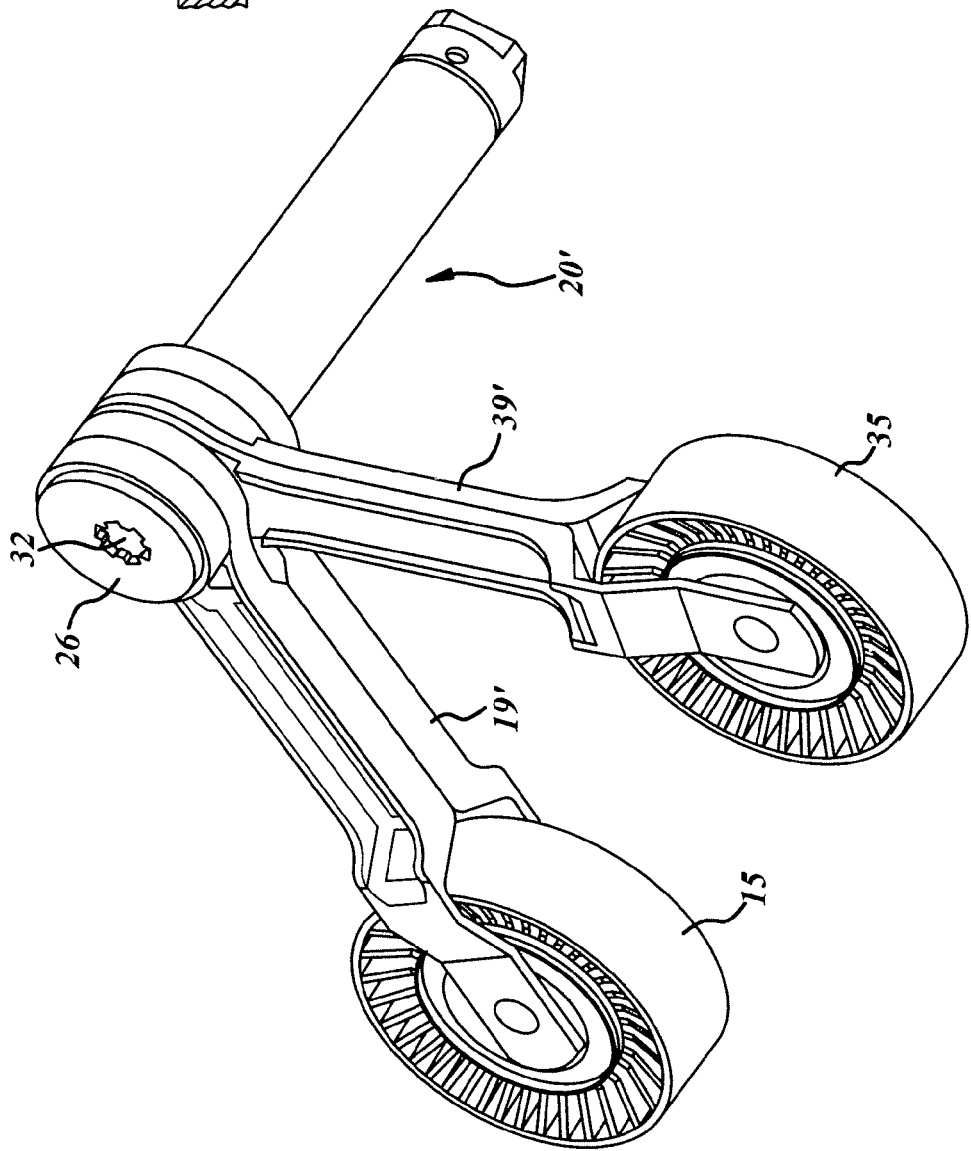
FIG. 16 shows a perspective illustration of a two-arm belt tensioning device for a belt drive according to FIG. 5 in a further embodiment.

FIG. 16 shows an inventive belt tensioning device in a further embodiment with a first tensioning roller 15, a first tensioning arm 19', a second tensioning roller 35, a second tensioning arm 39', and a torsion spring assembly 20'. The first tensioning arm 19', which is connected in a rotationally fixed way to a bush 26 shaped cover-like, at its tope end, is divided yoke-like, whereas the second tensioning arm 39' which his connected to the tube 29 of the torsions spring assembly 20' engages between the two yoke parts. It can be seen that a torsion spring 32 form-fittingly engages the bush 26. The two tensioning arms 19' and 39' are each composed of two halves, as shown in greater detail at the tope end of FIG. 14.

Figure 17:
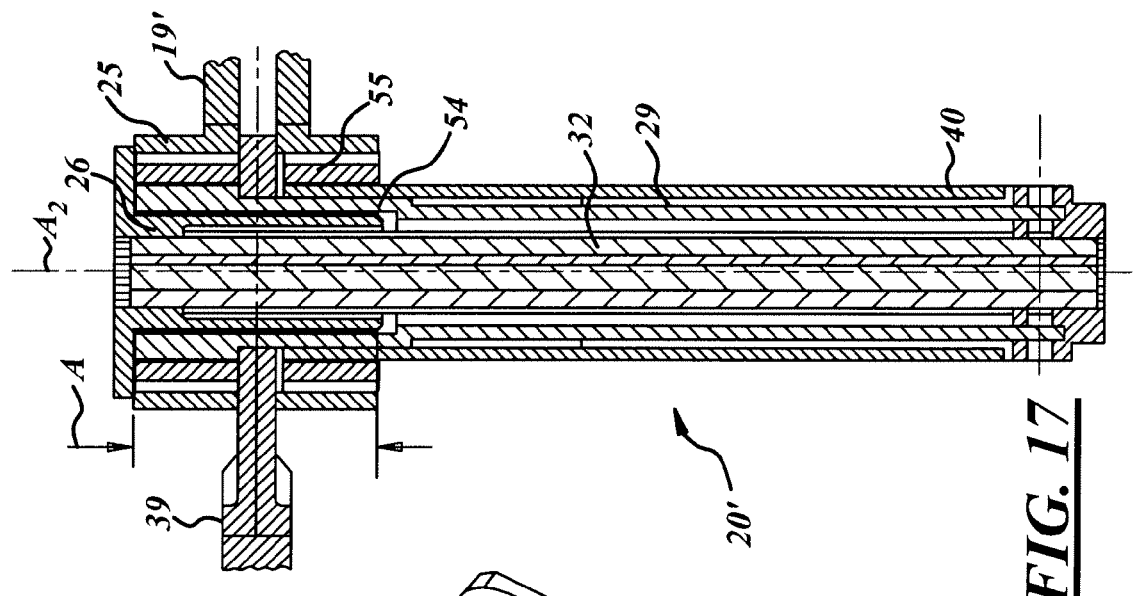
FIG. 17 shows the belt tensioning device according to FIG. 16 in a section through the axes of rotation.

FIG. 17 shows the device according to FIG. 16 in a partial section through the central axis $A_2$ of the torsion spring 32. The torsion spring 32, at its top end, is form-fittingly inserted into the first bush 26 which, via its cover-like shape, is connected to the first tensioning arm 10' in a rotationally fixed way and which, at its lower end, is connected to a second bush 28 in a rotationally fixed way. The second bush 28, in turn, is connected to the tube 29 in a rotationally fixed way. The second tensioning arm 39' which, as can be seen, also consist of two halves, is firmly placed onto the upper end of the tube 29. In this embodiment, too, the fist bush 26 and the tube 29 form a bearing region 54 with one another. Inside the eye 25 of the tensioning arm 19' there is positioned a further sleeve 55 which forms a friction damping element which is effective between the upper end of the tube 29 and the eye 25. In the present case, the tube 29 is surrounded by a spacing sleeve 40 relative to which the tube 29 is freely rotatable. The spacing sleeve 40 serves to secure the rotary spring assembly 20' in the rack. The central plane of movement E of the tensioning rollers and tensioning arms (not illustrated in this Figure), which, at the same time, forms the central dividing plane of the two tensioning arms 19' and 39', in this embodiment, too, in accordance with the invention is positioned centrally relative to the axial length A of the bearing 54 between the first bush 26 and the tube 29, so that the bearing assembly is free from transverse forces and bending moments and operates in an interference-free way, even if high forces are generated between the first and second tensioning arms 19', 39'.

From the foregoing, it can be seen that there has been brought to the art a new and improved belt tensioning device which has the advantage of a compact and efficient design. While the invention has been described in connection with one or more embodiments, it should be understood that the invention is not limited to those embodiments. For example, although described with regard to a vehicle engine application, the present belt tensioning device could equally find application in other belt driven systems. Thus, the invention covers all alternatives, modifications, and equivalents as may be included within the spirit and scope of the appended claims.

The invention claimed is:

1. A belt tensioning device for a belt drive having at least two belt pulleys and a continuous belt, the belt tensioning device comprising:
   a torsion spring assembly with a longitudinal axis ($A_2$);
   a tensioning arm which, at one end, is arranged at the torsion spring assembly so as to be aligned approximately radially relative to the longitudinal axis ($A_2$); and
   a tensioning roller rotatably arranged at the other end of the tensioning arm, wherein an axis of rotation ($A_1$) of the tensioning roller extends substantially parallel relative to the longitudinal axis ($A_2$) of the torsion spring assembly and wherein the tensioning arm can be resiliently supported relative to the rack so as to oscillate around the longitudinal axis ($A_2$);
   wherein the torsion spring assembly comprises a plurality of individual torsion bars which, by being clamped together at their ends, form a bundle and are in line contact or surface contact with one another.

2. A device according to claim 1 comprising a damping unit articulated at the tensioning arm and supported at the rack.

3. A device according to claim 1, wherein the bundle of torsion bars is clamped in at a first end of the torsion spring assembly in a fixing bush.

4. A device according to claim 3, wherein the bundle of torsion bars is clamped in at a second end of the torsion spring assembly in another bush which is connected in a rotationally fixed way to the one end of the tensioning arm.

5. A device according to claim 1, wherein the bundle of torsion bars is enclosed by a tube which, at its two ends, is connected in a rotationally fixed way to the two ends of the bundle of torsion bars and forms a rotary tube spring extending in parallel to the bundle of torsion bars.

6. A device according to claim 1, wherein the bundle of torsion bars is enclosed by a tube which, at its one end, is connected in a rotationally fixed way to one end of the bundle of torsion bars and which, at is other end, is freely rotatable relative to the bundle by a limited angular amount and, thereafter, abuts against the bundle and forms a rotary tube spring which can be sequentially added to the bundle of torsion bars.

7. A device according to claim 1, wherein the bundle of torsion bars is enclosed by a tube which, at its one end, is connected in a rotationally fixed way to one end of the bundle of torsion bars and which, at its other end, is rotatable under friction relative to the other end of the bundle and forms a friction damping element connected in parallel to the bundle of torsion bars.

8. A belt drive comprising at least two belt pulleys, a continuous belt, and a belt tensioning device according to claim 1.

* * * * *